(12) United States Patent
Sakamoto et al.

(10) Patent No.: US 11,485,193 B2
(45) Date of Patent: Nov. 1, 2022

(54) HEAT MANAGEMENT SYSTEM FOR VEHICLE

(71) Applicants: TOYOTA JIDOSHA KABUSHIKI KAISHA, Toyota (JP); SUBARU CORPORATION, Tokyo (JP)

(72) Inventors: Hironobu Sakamoto, Okazaki (JP); Hideo Nishioka, Toyota (JP); Naoki Takeuchi, Toyota (JP); Yasuhiro Yokota, Nagoya (JP); Yoshihiro Ishihara, Shibuya-ku (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 118 days.

(21) Appl. No.: 17/186,901

(22) Filed: Feb. 26, 2021

(65) Prior Publication Data

US 2021/0300147 A1    Sep. 30, 2021

(30) Foreign Application Priority Data

Mar. 31, 2020   (JP) .............................. JP2020-064181

(51) Int. Cl.
*F25B 41/00*     (2021.01)
*F25B 49/00*     (2006.01)
*B60H 1/00*      (2006.01)

(52) U.S. Cl.
CPC ..... *B60H 1/00328* (2013.01); *B60H 1/00485* (2013.01); *B60H 1/00885* (2013.01)

(58) Field of Classification Search
CPC ............ B60H 1/00328; B60H 1/00485; B60H 1/00885
USPC ........................................................ 62/196.1
See application file for complete search history.

(56) References Cited

U.S. PATENT DOCUMENTS

| 2014/0318163 | A1* | 10/2014 | Takayama | ............... F25B 49/00 62/196.1 |
| 2015/0308701 | A1* | 10/2015 | Yamashita | .............. F25B 9/006 62/196.1 |
| 2016/0153343 | A1* | 6/2016 | Kakehashi | ........... B60H 1/3228 123/41.31 |

FOREIGN PATENT DOCUMENTS

| JP | 2019-119369 A | 7/2019 |
| JP | 2019-213337 A | 12/2019 |

* cited by examiner

*Primary Examiner* — Davis D Hwu
(74) *Attorney, Agent, or Firm* — Oliff PLC (57) ABSTRACT

A heat management system disclosed herein is used for a vehicle. The heat management system may include an electric device, a first heat exchanger, a second heat exchanger, a first channel, a second channel, a first pump, a second pump, a first channel valve, a second channel valve, a bypass channel, and a controller. The controller may be configured to, when one of the first pump and the second pump operates abnormally, control the first channel valve and the second channel valve such that the flow of the first heat medium from both of the first channel and the second channel to the first heat exchanger is allowed and activate the other of the first pump and the second pump.

3 Claims, 5 Drawing Sheets

HEAT MANAGEMENT SYSTEM FOR VEHICLE

CROSS-REFERENCE TO RELATED APPLICATION

This application claims priority to Japanese Patent Application No. 2020-064181 filed on Mar. 31, 2020, the contents of which are hereby incorporated by reference into the present application.

TECHNICAL FIELD

The technology disclosed herein relates to a heat management system for a vehicle.

BACKGROUND

A cruising range of an electric vehicle can be increased by suitably utilizing heat of its traction motor and heat of outside air to reduce power consumption of an electric device used for temperature regulation. Japanese Patent Application Publication Nos. 2019-213337 and 2019-119369 each propose a heat management system for an electric vehicle that comprehensively manages heat of outside air and heat of a motor, an inverter, and a battery to suitably utilize the heat of each portion of the electric vehicle. The "electric vehicle" herein includes a hybrid vehicle and a fuel-cell vehicle.

The heat management system of Japanese Patent Application Publication No. 2019-213337 includes a first temperature regulation circuit and a second temperature regulation circuit. The first temperature regulation circuit is configured to cool electric devices that generate heat while operating (e.g., a traction motor and a power converter configured to supply electric power to the motor). The second temperature regulation circuit is configured to regulate the temperature of a cabin. In the first temperature regulation circuit, a first pump circulates first heat medium through the electric devices and a radiator. In the second temperature regulation circuit, a second pump circulates second heat medium between a chiller for air-conditioning in the cabin and an air conditioner outdoor unit. The radiator and the air conditioner outdoor unit are arranged adjacent to each other, thus heat is exchanged also between the first heat medium and the second heat medium.

SUMMARY

In the heat management system of Japanese Patent Application Publication No. 2019-213337, heat can be exchanged between the radiator in the first temperature regulation circuit (temperature regulation circuit for the motor and the power converter) and the air conditioner outdoor unit in the second temperature regulation circuit (temperature regulation circuit for the cabin). The inventors have considered to actively utilize the radiator (which will hereinafter be termed a first heat exchanger) used to emit the heat of the electric device to regulate the temperature of the cabin. That is, they have considered to incorporate a second heat exchanger configured to exchange heat between the first heat medium in the first temperature regulation circuit and the second heat medium in the second temperature regulation circuit, a second channel, a first channel valve, and a second channel valve into the heat management system. Hereinbelow, a channel that connects the electric device and the first heat exchanger to each other will be termed a first channel.

The second channel extends through the second heat exchanger and is connected to an inlet and an outlet of the first heat exchanger. The first channel is also connected to the inlet and the outlet of the first heat exchanger. The first heat exchanger is shared between a circulating system of the first channel and a circulating system of the second channel. The first channel valve is configured to cut off a flow of the first heat medium from the first channel to the first heat exchanger. The second channel valve is configured to cut off a flow of the first heat medium from the second channel to the first heat exchanger.

The first heat medium circulating in the first channel cools the heat generating electric device. The first heat medium releases the heat of the electric device in the first heat exchanger. When the air in the cabin is to be heated, the first heat medium circulating in the second channel absorbs heat of outside air in the first heat exchanger. The first heat medium circulating in the first channel while cooling the electric device has a relatively high temperature. The first heat medium circulating in the second channel while being cooled by the second heat exchanger has a temperature lower than the temperature of the outside air. If the first heat medium in a temperature zone mixes with the first heat medium in a different temperature zone, the temperature of the first heat medium is thereby changed, and hence the first heat medium cannot properly transfer its heat. A controller is therefore configured to control the first and second channel valves such that a flow of the first heat medium from one of the first channel and the second channel to the first heat exchanger is allowed and a flow of the first heat medium from the other of the first channel and the second channel to the first heat exchanger is cut off. This controller's control over the channel valves prevents the first heat medium in a temperature zone from mixing with the first heat medium in a different temperature zone.

Owing to the controller's control over the channel valves, the first heat medium flowing in the first channel is not allowed to enter the second channel and the first heat medium flowing in the second channel is not allowed to enter the first channel To circulate the first heat medium in each of the channels, a first pump is disposed in the first channel and a second pump is disposed in the second channel.

A pump may malfunction with entry of foreign matter thereinto. In case of a non-self-suction pump, it may malfunction even with entry of air bubbles. A phenomenon that a pump malfunctions with entry of foreign matter or air bubbles will hereinafter be expressed as "the pump operates abnormally".

The disclosure herein provides a heat management system that has the above-described structure and is configured to allow the first heat medium flowing in one of the channels to merge with the first heat medium flowing in the other of the channels when one of the pumps operates abnormally, such that the abnormal operation of the one of the pumps is resolved by utilizing the other of the pumps.

The heat management system disclosed herein is used for a vehicle. The heat management system may include an electric device, a first heat exchanger, a second heat exchanger, a first channel, a second channel, a first pump, a second pump, a first channel valve, a second channel valve, a bypass channel, and a controller.

The first heat exchanger may be configured to exchange heat between first heat medium for cooling the electrical device and outside air. The second heat exchanger may be configured to exchange heat between second heat medium for an air conditioner of a cabin and the first heat medium.

The first heat medium may flow in the first channel and the second channel. The first channel may extend through the electrical device and be connected to an inlet and an outlet of the first heat exchanger. The second channel may extend through the second heat exchanger and be connected to the inlet and the outlet of the first heat exchanger. The first pump may be arranged in the first channel and be configured to circulate the first heat medium in the first channel The second pump may be arranged in the second channel and be configured to circulate the first heat medium in the second channel The first channel valve may be configured to cut off communication between the first channel and the first heat exchanger. The second channel valve may be configured to cut off communication between the second channel and the first heat exchanger. The bypass channel may be connected to the first channel and be configured to allow the first heat medium to bypass the first heat exchanger and circulate between the electrical device and the first pump when the first channel valve cuts off communication between the first channel and the first heat exchanger. The controller may be configured to, when the first pump and the second pump operate normally, control the first channel valve and the second channel valve such that a flow of the first heat medium from one of the first channel and the second channel to the first heat exchanger is allowed and a flow of the first heat medium from the other of the first channel and the second channel to the first heat exchanger is cut off. The controller may be configured to, when one of the first pump and the second pump operates abnormally, control the first channel valve and the second channel valve such that the flow of the first heat medium from both of the first channel and the second channel to the first heat exchanger is allowed and activate the other of the first pump and the second pump.

When both of the first pump and the second pump operate normally, the controller of the above-described heat management system allows the first heat medium to flow from one of the first channel and the second channel to the first heat exchanger and cuts off the flow of the first heat medium from the other of the first channel and the second channel to the first heat exchanger. This prevents the first heat medium that circulates in the first channel and cools the electric device from merging with the first heat medium that circulates in the second channel and absorbs heat of the outside air. When one of the first pump and the second pump operates abnormally, the controller allows the first heat medium to flow from both of the first channel and the second channel to the first heat exchanger and activates the other of the first pump and the second pump. When the first heat medium is allowed to flow from both of the first channel and the second channel to the first heat exchanger, the first heat medium in the first channel merges with the first heat medium in the second channel. The first heat medium flows in both of the first channel and the second channel by the operation of the normally operating pump. In the above-described structure, the first heat medium flows backward in the abnormally operating pump. The first heat medium flowing backward in the abnormally operating pump pushes foreign matter (or air bubbles) out of the pump. Consequently, the abnormal operation of the pump is resolved.

The above-described heat management system may further comprise a second bypass channel connected to the second channel The second bypass channel may be configured to allow the first heat medium to bypass the first heat exchanger and circulate between the second heat exchanger and the second pump when the second channel valve cuts off the flow of the first medium from the second channel to the first heat exchanger. This enables the first heat medium to circulate between the second heat exchanger and the second pump while the second channel valve cuts off the fluid communication between the second channel and the first heat exchanger.

In the above-described heat management system, a reservoir tank may be connected to one of the first channel and the second channel In the reservoir tank, a surface of the first heat medium may be in contact with air. This enables the air bubbles pushed out of the pump by the first heat medium flowing backward in the pump to be released into the air.

DETAILED DESCRIPTION

Some of the features characteristic to the heat management system disclosed herein will be listed. It should be noted that the respective technical elements are independent of one another, and are useful solely or in combinations.

Figure 1:
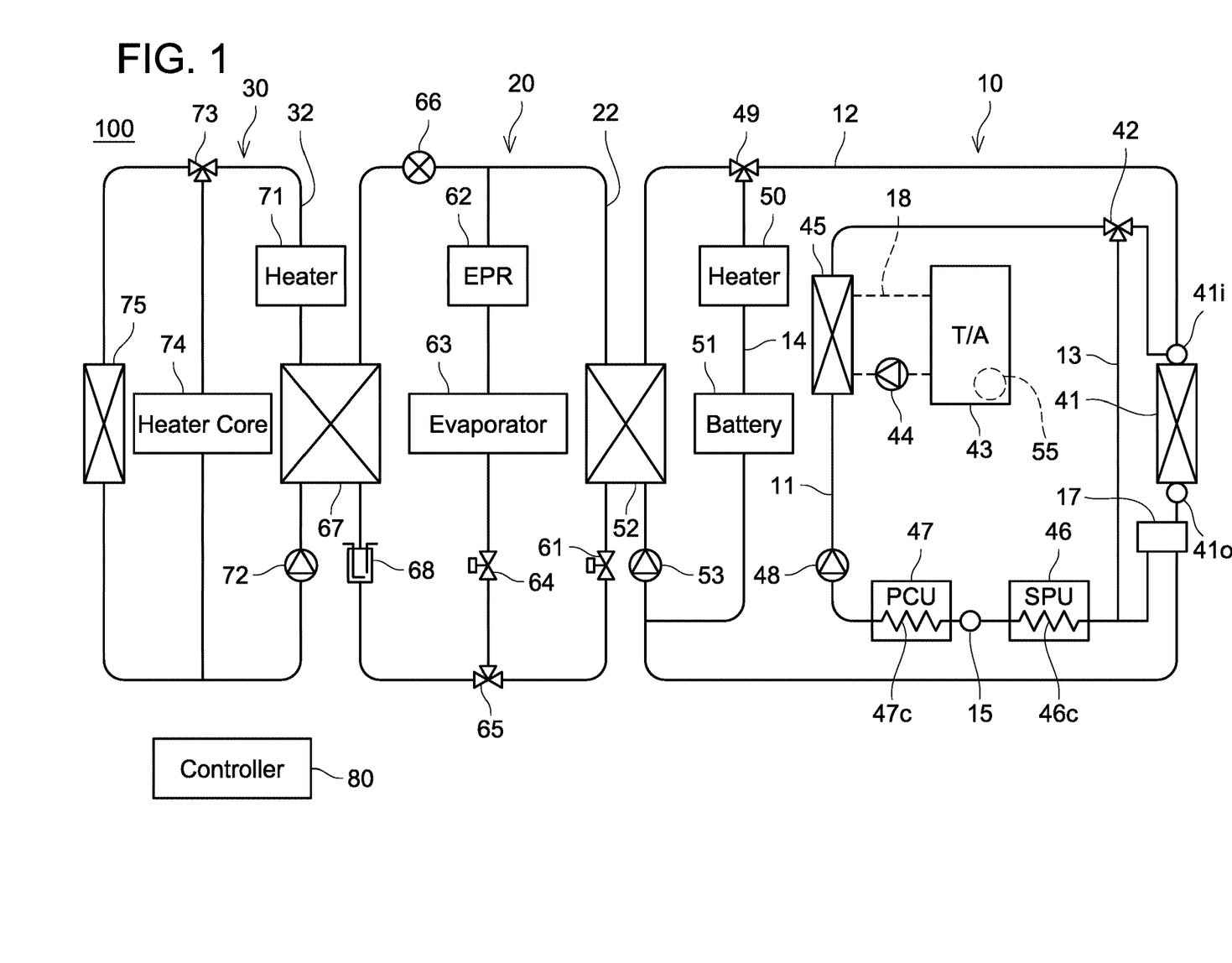
FIG. 1 is a diagram showing a heat management system according to an embodiment.

With reference to the drawings, a heat management system 100 according to an embodiment will be described. FIG. 1 shows a circuit diagram of the heat management system 100. The heat management system 100 is mounted on an electric vehicle and is configured to regulate the temperatures of a vehicle-mounted device and a cabin. The heat management system 100 regulates the temperatures of a traction motor 55, a battery 51 storing electric power for the motor 55, and a smart power unit (SPU) 46 and a power control unit (PCU) 47 that supply the electric power to the motor 55.

Output of the battery 51 exceeds 200 volts. When outputting large electric power, the battery 51 generates heat. The SPU 46 distributes the electric power of the battery 51 to some devices including the PCU 47. The SPU 46 includes a DC-DC converter and is configured to step down the voltage of electric power of the battery 51 to supply it to auxiliary equipment (vehicle-mounted low-power device). The PCU 47 is configured to convert the DC power of the battery 51 into AC power to supply it to the motor 55. The SPU 46 and the PCU 47 also generate heat while operating.

The heat management system 100 mainly functions to cool the motor 55, the battery 51, the SPU 46, and the PCU 47, but it functions to warm these devices when the vehicle travels in cold climates.

The heat management system 100 includes a first heat circuit 10, a second heat circuit 20, and a third heat circuit 30. Heat media respectively flow in the first heat circuit 10, the second heat circuit 20, and the third heat circuit 30. Channels in which the heat media flow are independent from each other among the first heat circuit 10, the second heat circuit 20, and the third heat circuit 30. Herein, the heat medium flowing in the first heat circuit 10 is termed first heat medium, the heat medium flowing in the second heat circuit 20 is termed second heat medium, and the heat medium flowing in the third heat circuit 30 is termed third heat medium.

As will be described later, the second heat medium changes in phase between gas and liquid in the second heat circuit 20. Hydrofluorocarbons having relatively low boiling points are suitable for the second heat medium. In the first heat circuit 10, the first heat medium may exchange heat with the outside air, and in the third heat circuit 30, the third heat medium may exchange heat with the outside air. Water or antifreeze, which is a liquid at room temperature, is suitable for the first heat medium and the third heat medium. Other materials may be used for the first heat medium, the second heat medium, and the third heat medium.

The first heat circuit 10 regulates the temperature of the vehicle-mounted device. The second heat circuit 20 and the third heat circuit 30 regulate the temperature of the cabin. For cooling the vehicle-mounted device, the first heat circuit 10 releases the heat of the first heat medium to the outside air. When a heater for the cabin is turned on, the first heat circuit 10 may heat the second heat medium by utilizing the heat of the outside air. The disclosure herein focuses on cooling the device while heating the air in the cabin. In the present embodiment, descriptions for temperature rise in the device and cooling of the air in the cabin will not be described.

The first heat circuit 10 includes a first channel 11, a second channel 12, a first bypass channel 13, a second bypass channel 14, and a reservoir tank 17. As described above, the first heat circuit 10 cools the SPU 46, the PCU 47, the motor 55, and the battery 51. The motor 55 is cooled by the first heat medium via oil.

The first channel 11 extends through the SPU 46, the PCU 47, and an oil cooler 45. One end of the first channel 11 is connected to an inlet 41i of a low-temperature radiator 41, and another end thereof is connected to an outlet 41o of the low-temperature radiator 41 via the reservoir tank 17. A temperature sensor 15 is disposed on the first channel 11 between the SPU 46 and the PCU 47. The temperature sensor 15 measures the temperature of the first heat medium flowing in the first channel 11. A first pump 48 is disposed on the first channel 11. The first pump 48 is a non-self-suction pump. The first pump 48 includes a suction port on PCU 47 side and a discharge port on oil cooler 45 side. The first pump 48 suctions the first heat medium from the suction port and pumps it out from the discharge port into the first channel 11. The first pump 48 circulates the first heat medium through the oil cooler 45, the low-temperature radiator 41, the SPU 46, and the PCU 47 in this order in the first channel 11.

The first pump 48 is controlled by a controller 80. The controller 80 controls an output (or rotational speed) of the first pump 48 in accordance with the temperature of each electric device (i.e., the SPU 46, the PCU 47, and the motor 55 (oil)). The controller 80 controls the output of the first pump 48 such that the temperature of each electric device falls within a predetermined temperature range. The controller 80 inactivates the first pump 48 in response to the temperature of each electric device becoming lower than its lower limit temperature. In response to the temperature of each electric device becoming higher than its upper limit temperature, the controller 80 releases the heat of the first heat medium to the outside air by using the low-temperature radiator 41, which will be described later. The output of the first pump 48 is represented, for example, as the rotational speed of the first pump 48.

An SPU cooler 46c is disposed in the SPU 46. A PCU cooler 47c is disposed in the PCU 47. The SPU cooler 46c and the PCU cooler 47c are connected to the first channel 11. The first heat medium flows through the SPU cooler 46c and the PCU cooler 47c to cool the SPU 46 and the PCU 47.

An oil circulation path 18 is connected to the oil cooler 45. The oil circulation path 18 extends inside a transaxle 43. The transaxle 43 houses the motor 55. A part of the oil circulation path 18 extends through a sliding portion (i.e., a bearing portion) of the motor 55. In other words, oil in the oil circulation path 18 also functions as lubricating oil in the motor 55. An oil pump 44 is disposed on the oil circulation path 18. The oil pump 44 circulates the oil in the oil circulation path 18. The oil that has cooled the motor 55 is cooled by the first heat medium in the oil cooler 45.

The first heat medium that has cooled the SPU 46, the PCU 47, and the motor 55 (the oil in the oil cooler 45) flows through the low-temperature radiator 41. The heat of the first heat medium is released to the outside air in the low-temperature radiator 41. The low-temperature radiator 41 exchanges heat between the first heat medium and the outside air.

The first bypass channel 13 is connected to the first channel 11. One end of the first bypass channel 13 is connected to an upstream part of the first channel 11 via a first channel valve 42, and another end thereof is connected to a downstream part of the first channel 11.

The first channel 11 is brought into fluid communication with one of the low-temperature radiator 41 and the first bypass channel 13 by the first channel valve 42. The first channel valve 42 is switchable between a first valve position and a second valve position. At the first valve position, the first channel valve 42 allows a flow of the first heat medium from the first channel 11 to the low temperature radiator 41 and cuts off the flow of the first heat medium from the first channel 11 to the first bypass channel 13. At the second valve position, the first channel valve 42 allows the flow of the first heat medium from the first channel 11 to the first bypass channel 13 and cuts off the flow of the first heat medium from the first channel 11 to the low-temperature radiator 41. When the pump 48 is activated with the first channel valve 42 at the first valve position, the first heat medium circulates through the SPU 46, the PCU 47, the oil cooler 45, and the low-temperature radiator 41. The heat of the SPU 46, the PCU 47, and the motor 55 (the oil) is released to the outside air via the first heat medium.

When the pump 48 is activated with the first channel valve 42 at the second valve position, the first heat medium bypasses the low-temperature radiator 41 and circulates through the SPU 46, the PCU 47, and the oil cooler 45. The temperature of the first heat medium rises due to the heat of the SPU 46, the PCU 47, and the motor 55 (the oil). The first channel valve 42 is controlled by the controller 80. Control over the first channel valve 42 will be described later.

The second channel 12 extends through a chiller 52. One end of the second channel 12 is connected to the inlet 41i of the low-temperature radiator 41, and another end thereof is connected to the outlet 41o of the low-temperature radiator 41 via the reservoir tank 17. The low-temperature radiator 41 is shared between the first channel 11 and the second channel 12. A second pump 53 is disposed on the second channel 12. Similar to the first pump 48, the second pump 53 is also a non-self-suction pump. The second pump 53 includes a discharge port on chiller 52 side and a suction port opposite to the discharge port. The second pump 53 suctions the first heat medium from the suction port and pumps it out from the discharge port into the second channel 12. The second pump 53 circulates the first heat medium through the chiller 52 and the low-temperature radiator 41 in this order in the second channel 12.

The second pump 53 is also controlled by the controller 80. The controller 80 controls an output of the second pump 53 in accordance with the temperature of the first heat medium at the outlet 410 of the low-temperature radiator 41. The controller 80 controls the output of the second pump 53 such that the temperature of the first heat medium at the outlet 410 of the low-temperature radiator 41 falls within a predetermined temperature range. The output of the second pump 53 is represented, for example, as its rotational speed.

A circulation path 22 of the second heat circuit 20 extends through the chiller 52. The chiller 52 transfers the heat of the first heat medium to the second heat medium. In other words, the chiller 52 exchanges heat between the first heat medium and the second heat medium. A role of the chiller 52 will be described later.

The second bypass channel 14 is connected to the second channel 12. The second bypass channel 14 extends through the battery 51. One end of the second bypass channel 14 is connected to the second channel 12 via a second channel valve 49 at a position downstream of the chiller 52. Another end of the second bypass channel 14 is connected to the second channel 12 at a position upstream of the second pump 53.

The chiller 52 is brought into fluid communication with one of the low-temperature radiator 41 and the second bypass channel 14 by the second channel valve 49. The second channel valve 49 is switchable between a first valve position and a second valve position. At the first valve position, the second channel valve 49 allows the flow of the first heat medium from the chiller 52 to the second bypass channel 14 and cuts off the flow of the first heat medium from the chiller 52 to the low-temperature radiator 41. At the second valve position, the second channel valve 49 allows the flow of the first heat medium from the chiller 52 to the low-temperature radiator 41 and cuts off the flow of the first heat medium from the chiller 52 to the second bypass channel 14. When the second pump 53 is activated with the second channel valve 49 at the first valve position, the first heat medium circulates between the chiller 52 and the battery 51. The first heat medium cools the battery 51, and then the first heat medium with high temperature is cooled by the second heat medium in the chiller 52. In other words, the second bypass channel 14 allows the first heat medium to bypass the low-temperature radiator 41 and circulate between the chiller 52 and the second pump 53 when the second channel valve 49 cuts off the communication between the second channel 12 and the low-temperature radiator 41.

When the second pump 53 is activated with the second channel valve 49 at the second valve position, the first heat medium flows through the second channel 12 and circulates between the chiller 52 and the low-temperature radiator 41. The first heat medium circulates between the chiller 52 and the low-temperature radiator 41 in a heat pump mode. The heat pump mode will be described later.

A heater 50 is disposed upstream of the battery 51 on the second bypass channel 14. When the temperature of the battery 51 decreases due to cold climates and/or the like, the first heat medium is heated by the heater 50, and then the heated first heat medium heats the battery 51.

The reservoir tank 17 is disposed downstream of the outlet 410 of the low-temperature radiator 41. In the reservoir tank 17, a surface of the first heat medium is in contact with air. A filter (not shown) is disposed in the reservoir tank 17 to remove foreign matter contained in the first heat medium. Air (air bubbles) in the channels is released to the outside air in the reservoir tank 17. Foreign matter in the channels is captured and removed by the filter in the reservoir tank 17. As shown in FIG. 1, the reservoir tank 17 is connected to the outlet 410 of the low-temperature radiator 41, and the first channel 11 and the second channel 12 are connected to the outlet 410 of the low-temperature radiator 41 via the reservoir tank 17.

As described above, the second heat circuit 20 and the third heat circuit 30 regulate the temperature of the cabin. The second heat circuit 20 is used mainly to cool the air in the cabin. The second heat circuit 20 includes the circulation path 22, an evaporator 63, a compressor 66, an evaporator pressure regulator (EPR) 62, a condenser 67, and a modulator 68.

A third channel valve 65 is disposed on the circulation path 22. The third channel valve 65 is switchable between a first valve position and a second valve position. At the first valve position, the third channel valve 65 allows a flow of the second heat medium from the condenser 67 to the evaporator 63. At the second valve position, the third channel valve 65 allows the flow of the second heat medium from the condenser 67 to the chiller 52.

The third channel valve 65 selects the first valve position to cool the cabin. The second heat medium is compressed in the compressor 66 and turns into a high-temperature gas. This second heat medium is cooled in the condenser 67 and thereby runs into a liquid. Only the second heat medium that is in form of liquid in the modulator 68 flows to the third channel valve 65. The liquid second heat medium flows through an expansion valve 64 and the evaporator 63, as a result of which the second heat medium is evaporated and its temperature sharply decreases. The second heat medium with the low temperature cools the air in the cabin. The second heat medium passes through the EPR 62 and is then compressed again in the compressor 66.

In the heat pump mode, the third channel valve 65 is switched to the second valve position to allow the flow of the second heat medium from the condenser 67 to the chiller 52. The heat pump mode is selected when the air in the cabin is to be heated, which will be described later in detail. The second heat medium is compressed in the compressor 66 and turns into a high-temperature gas. In the heat pump mode, this second heat medium releases the heat to the third heat medium in the condenser 67 and turns into a liquid. Only the second heat medium that is in form of liquid in the modulator 68 flows to the third channel valve 65. The liquid second heat medium flows through an expansion valve 61 and the chiller 52, as a result of which the second heat medium is evaporated and its temperature sharply decreases. The second heat medium with the low temperature absorbs heat from the first heat medium passing through the chiller 52, as a result of which the temperature of the second heat medium is increased. This second heat medium is compressed in the compressor 66, thus its temperature is increased further. This second heat medium releases the heat to the third heat medium in the condenser 67.

The third heat circuit 30 is used mainly to warm the air in the cabin. The third heat circuit 30 includes a circulation path 32, an electric heater 71, a heater core 74, a third pump 72, a high-temperature radiator 75, and a fourth channel valve 73. The air in the cabin is warmed by high-temperature third heat medium flowing in the heater core 74.

When the air in the cabin is to be warmed, the condenser 67, the electric heater 71, and the heater core 74 are brought into fluid communication with each other by the fourth channel valve 73. As described above, in the heat pump mode, the third heat medium is heated by the high-temperature second heat medium in the condenser 67. When the heated third heat medium passes through the heater core 74, it warms the air in the cabin. When the heat of the third heat medium is insufficient, the electric heater 71 heats the third heat medium.

When the heat management system 100 has excess heat, the fourth channel valve 73 allows the flow of the third heat medium from the condenser 67 to the high-temperature radiator 75. The heat transferred from the second heat medium to the third heat medium via the condenser 67 is released to the outside air in the high-temperature radiator 75.

When a cabin air heating mode is selected in the heat management system 100, the air in the cabin is warmed by the third heat medium passing through the heater core 74, as described above. In the cabin air heating mode, the heat of the outside air or the heat of the battery 51 is also utilized. The first heat medium in the first heat circuit 10 is heated by the heat of the outside air or the heat of the battery 51. In the chiller 52, the second heat medium is heated by the heated first heat medium. After passing through the chiller 52, the heated second heat medium is compressed in the compressor 66 and its temperature is thereby increased further. This second heat medium heats the third heat medium in the condenser 67. The third heat medium warms the air in the cabin in the heater core 74. A case of utilizing the heat of the outside air will be termed the heat pump mode.

The heat pump mode in which heat of the outside air is used will be described. In the heat pump mode, the first heat medium is heated by the heat of the outside air in the low-temperature radiator 41, and then the heated first heat medium heats the second heat medium in the chiller 52. How the heat of the second heat medium warms the air in the cabin is as described above. In the disclosure herein, how the heat of the outside air is transferred to the second heat medium for air conditioning in the cabin will be described. The heat pump mode is executed when the temperature of the first heat medium cooled in the chiller 52 is lower than the temperature of the outside air.

Figure 2:
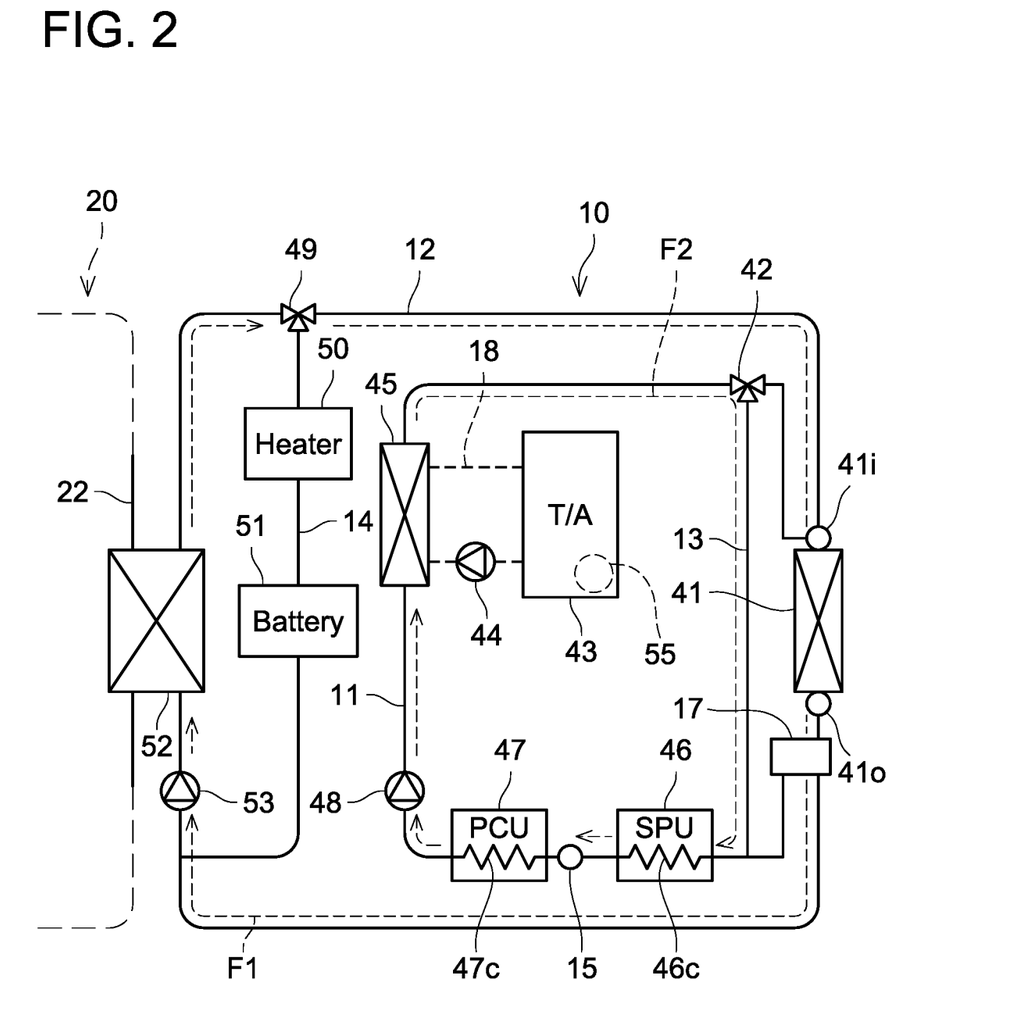
FIG. 2 is a circuit diagram showing a flow of first heat medium at a second valve position.

In the heat pump mode, the controller 80 controls the first and second channel valves 42, 49 synchronously. In the heat pump mode, the controller 80 basically holds both of the first and second channel valves 42 and 49 at the second positions. How the first heat medium flows at this time is shown in FIG. 2. FIG. 2 shows a part of the second heat circuit 20 (the circulation path 22), but does not show the other elements of the second heat circuit 20 nor the third heat circuit 30.

In the heat pump mode, the controller 80 basically holds the first and second channel valves 42, 49 at the second valve positions to allow the flow of the first heat medium from the second channel 12 to the low-temperature radiator 41 and cut off the flow of the first heat medium from the first channel 11 to the low-temperature radiator 41. As shown by a dashed arrow F1 in FIG. 2, the first heat medium circulates between the chiller 52 and the low-temperature radiator 41. At this time, the first heat medium in the first channel 11 bypasses the low-temperature radiator 41 and circulates through the SPU 46, the PCU 47, and the oil cooler 45.

Firstly, the first heat medium flowing in the second channel 12 will be described. The first heat medium that has been cooled in the chiller 52 flows into the low-temperature radiator 41. While passing through the low-temperature radiator 41, the first heat medium is heated by the outside air. The first heat medium that has been heated by the outside air heats the second heat medium in the chiller 52. As described above, the air in the cabin is warmed by the heat of the second heat medium. In other words, in the heat pump mode, the heat of the outside air is utilized to warm the air in the cabin. The temperature of the first heat medium decreases in the chiller 52. The first heat medium with the decreased temperature returns to the low-temperature radiator 41 and absorbs heat from the outside air again.

In the heat pump mode, as shown by a dashed arrow F2 in FIG. 2, the first heat medium in the first channel 11 does not pass through the low-temperature radiator 41. The temperature of the first heat medium flowing in the first channel 11 keeps rising. If the temperature of the first heat medium flowing in the first channel 11 becomes excessively high, the first heat medium cannot cool the SPU 46, the PCU 47, nor the motor 55. The temperature sensor 15 is disposed in the first heat circuit 10 between the SPU 46 and the PCU 47, and the controller 80 monitors the temperature of the first heat medium that has passed through the SPU cooler 46c. The controller 80 switches the first and second channel valves 42, 49 to their first valve positions in response to the temperature of the first heat medium that has passed through the SPU 46 (a measurement of the temperature sensor 15) becoming higher than an upper limit temperature.

Figure 3:
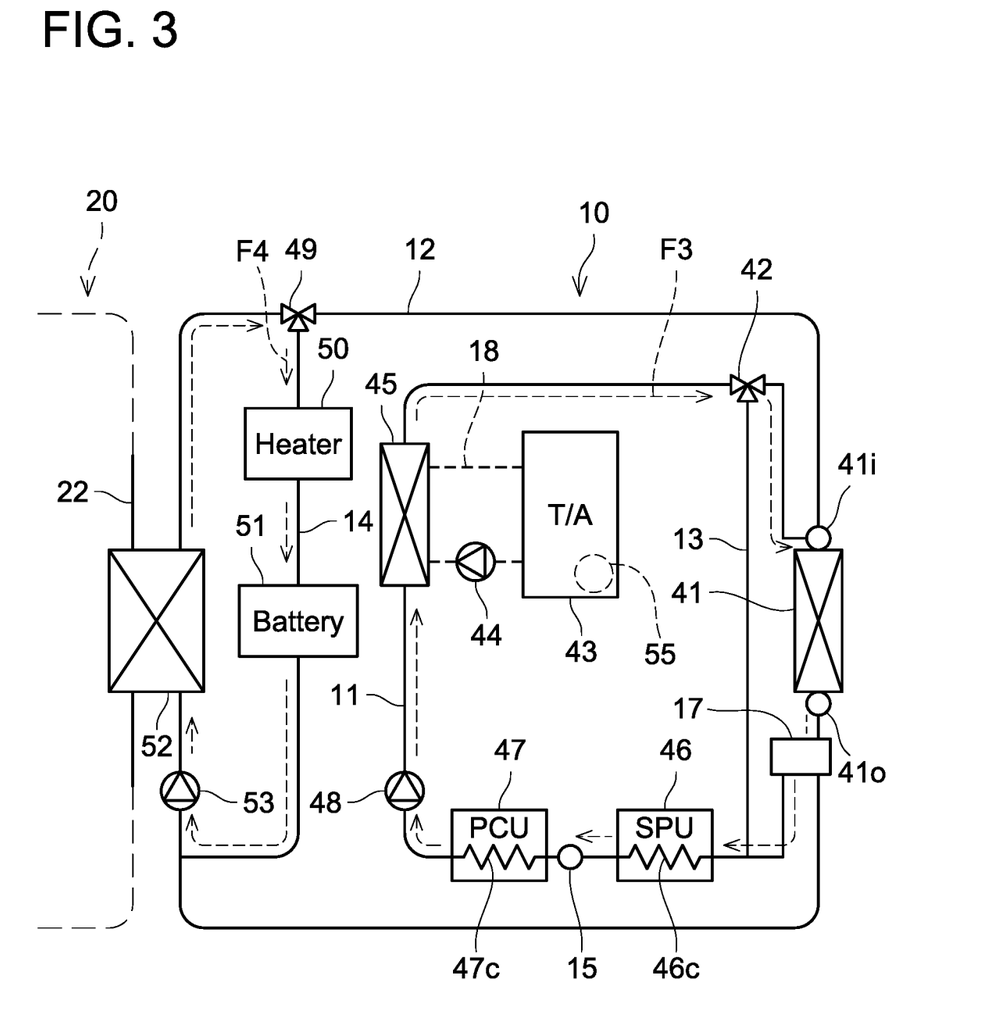
FIG. 3 is a circuit diagram showing a flow of the first heat medium at a first valve position.

FIG. 3 shows how the first heat medium flows after the first and second channel valves 42, 49 are switched to the first valve positions. When the first and second channel valves 42, 49 are switched to the first valve positions, the first heat medium is allowed to flow from the first channel 11 to the low-temperature radiator 41 and the first heat medium is stopped from flowing from the second channel 12 to low-temperature radiator 41. The controller 80 keeps activating the first pump 48. Consequently, as shown by a dashed arrow F3 in FIG. 3, the first heat medium whose temperature has become higher than the upper limit temperature in the first channel 11 flows into the low-temperature radiator 41. When flowing into the low-temperature radiator 41, the first heat medium is at a temperature higher than the temperature of the outside air. Thus, the first heat medium passing through the low-temperature radiator 41 releases the heat to the outside air. The SPU 46 and the PCU 47 are cooled by the first heat medium of which temperature has decreased by releasing the heat to the outside air.

When switching the first channel valve 42 on the first channel 11 to the first valve position, the controller 80 also switches the second channel valve 49 on the second channel 12 to the first valve position. When the second channel valve 49 is switched to the first valve position, the flow of the first heat medium from the chiller 52 to the low-temperature radiator 41 is cut off. When the second channel valve 49 is switched to the first valve position, the first heat medium in the second channel 12 bypasses the low-temperature radiator 41, passes through the heater 50, and circulates between the chiller 52 and the battery 51 as shown by a dashed arrow F4 in FIG. 3. In other words, when the second channel valve 49 is switched to the first valve position, the flow of the first heat medium from the second channel 12 to the low-temperature radiator 41 is cut off and the first heat medium is allowed to flow into the second bypass channel 14.

As described above, in the heat pump mode, the temperature of the first heat medium flowing in the second channel 12 is lower than the temperature of the outside air, and the temperature of the first heat medium flowing in the first channel 11 is higher than the temperature of the outside air. If the first heat medium flowing in the first channel 11 merges with the first heat medium flowing in the second channel 12, the temperature of the first heat medium flowing in the second channel 12 is thereby increased, such that heat may not be exchanged properly between the first heat medium and the outside air. The controller 80 cuts off the flow of the first heat medium from the second channel 12 to the low-temperature radiator 41 while the first heat medium is allowed to flow from the first channel 11 to the low-temperature radiator 41 for heat exchange between the low-temperature radiator 41 and the first heat medium whose temperature is higher than the temperature of the outside air. This prevents the first heat medium flowing in the first channel 11 from merging with the first heat medium flowing in the second channel 12.

As described above, the controller 80 controls the first channel valve 42 and the second channel valve 49 synchronously such that the flow of the first heat medium from one of the first channel 11 and the second channel 12 to the low-temperature radiator 41 is allowed and the flow of the first heat medium from the other of the first channel 11 and the second channel 12 to the low-temperature radiator 41 is cut off. This synchronous control prevents the first heat medium flowing in the first channel 11 from merging with the first heat medium flowing in the second channel 12. The controller 80 of the heat management system 100 according to the embodiment is configured to, when both of the first pump 48 and the second pump 53 operate normally, control the first channel valve 42 and the second channel valve 49 such that the flow of the first heat medium from one of the first channel 11 and the second channel 12 to the low-temperature radiator 41 is allowed and the flow of the first heat medium from the other of the first channel 11 and the second channel 12 to the low-temperature radiator 41 is cut off.

The first heat medium is a liquid and is typically water or antifreeze. The first pump 48 and the second pump 53 are non-self-suction pumps, and hence may malfunction when air bubbles enter. The pumps may malfunction when foreign matter enter, as well. In the disclosure herein, a phenomenon in which a pump malfunctions due to the entry of air bubbles or foreign matter is expressed as "the pump operates abnormally".

When the pump operates abnormally due to the entry of foreign matter, the pump does not rotate even though electric power is supplied thereto. When the pump operates abnormally due to the entry of air bubbles, the pump runs idle and its rotational speed is thereby extremely increased. A rotational speed sensor (not shown) is attached to each of the first pump 48 and the second pump 53. The controller 80 determines that the first pump 48 operates abnormally when its rotational speed is zero (or approximately zero) despite electric power being supplied to the first pump 48. Moreover, the controller 80 determines that the first pump 48 operates abnormally when the rotational speed of the first pump 48 is larger than a predetermined upper limit rotational speed. In other words, the controller 80 determines that the first pump 48 operates abnormally when the rotational speed of the first pump 48 is out of a predetermined allowable range. The same applies to the second pump 53. The controller 80 determines that the second pump 53 operates abnormally when the rotational speed of the second pump 53 is out of a predetermined allowable range.

Another method by which the controller 80 detects an abnormal operation of a pump will be described. The controller 80 may execute feedback control such that the rotational speed of the first pump 48 coincides with a target rotational speed. While the feedback control is executed, if the first pump 48 operates abnormally due to foreign matter, its rotational speed does not increase, thus a current supplied to the first pump 48 increases. If the first pump 48 operates abnormally due to air bubbles, its rotational speed increases abnormally, thus a current supplied to the first pump 48 decreases. In case of executing the feedback control over the first pump 48, the controller 80 may determine that the first pump 48 operates abnormally when the current supplied to the first pump 48 is out of a predetermined allowable range. The same applies to the second pump 53.

Figure 4:
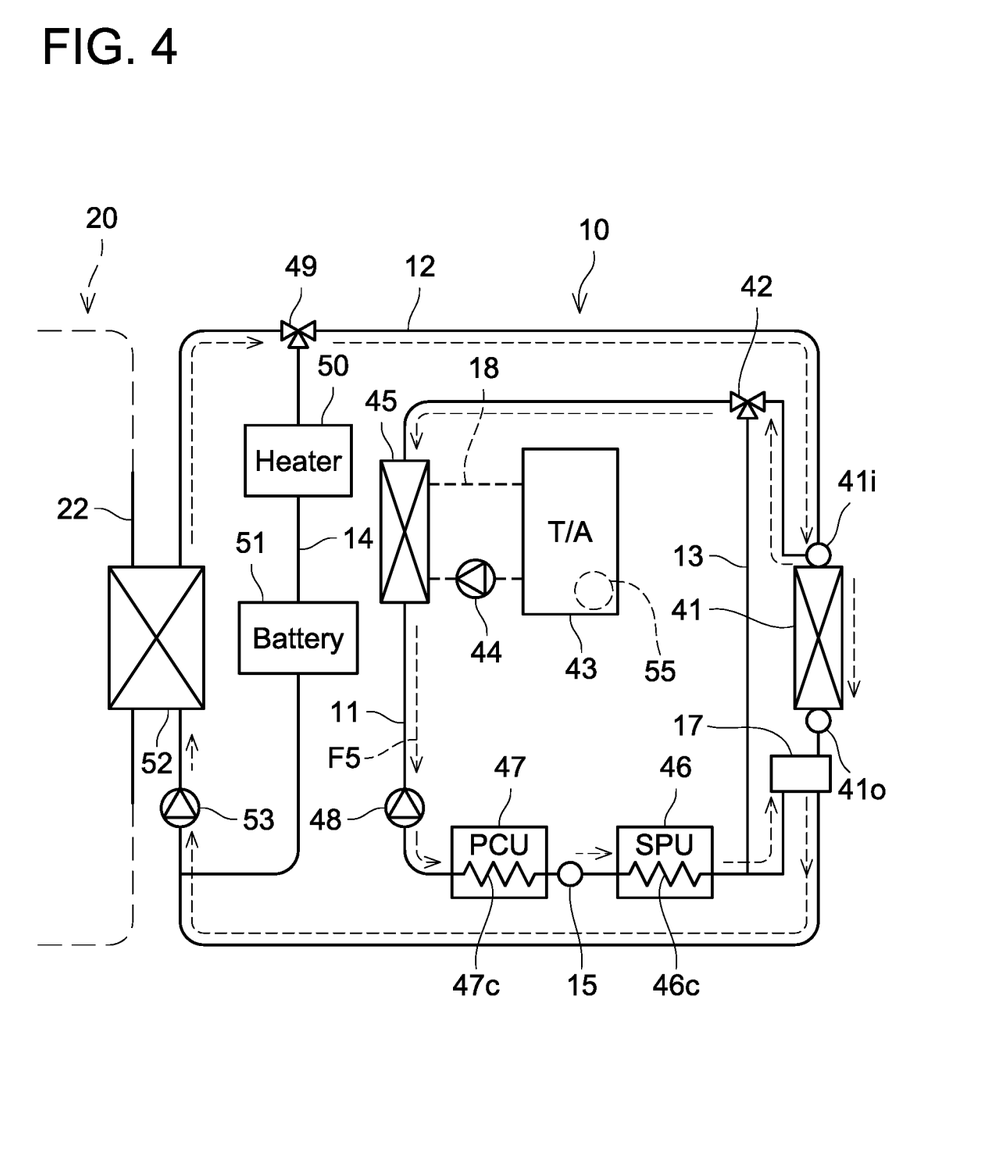
FIG. 4 is a circuit diagram showing a flow of the first heat medium when a first pump operates abnormally.

When one of the first pump 48 and the second pump 53 operates abnormally, the controller 80 attempts a special channel configuration to resolve the abnormal operation. With reference to FIG. 4, control executed by the controller 80 when the first pump 48 operates abnormally and a flow of the first heat medium under the control will be described. Control executed when the second pump 53 operates abnormally will be described later with reference to FIG. 5.

As described above, the controller 80 activates the first pump 48 in the heat pump mode. When determining that the first pump 48 operates abnormally based on the rotational speed of the first pump 48, the controller 80 inactivates the first pump 48. After this, the controller 80 switches the first channel valve 42 to the first valve position and holds the second channel valve 49 at the second valve position. In other words, the controller 80 allows the first heat medium to flow from both of the first channel 11 and the second channel 12 to the low-temperature radiator 41. The first channel 11 is connected to the second channel 12 via the inlet 41i of the low-temperature radiator 41. The controller 80 activates the second pump 53, which is not operating abnormally, at its maximum output. The second pump 53 pumps the first heat medium. As shown in FIG. 4, the first heat medium pumped out from the second pump 53 passes through the second channel 12 and splits at the inlet 41i of the low-temperature radiator 41. A part of the first heat medium flows from the second channel 12 into the low-temperature radiator 41, and the remaining part of the first heat medium flows backward in the first channel 11 through the first channel valve 42. As shown by a dashed arrow F5 in FIG. 4, the first heat medium that has flowed into the first channel 11 through the first channel valve 42 passes through the oil cooler 45 and flows into the first pump 48 from its downstream side. In other words, the first heat medium flows into the first pump 48, which is operating abnormally, from its discharge port. In the abnormally operating first pump 48, extraneous matter (air bubbles, foreign matter, or both of them) may remain. The first heat medium that has flowed into the first pump 48 from its discharge port pushes the extraneous matter in the first pump 48 to the outside of the first pump 48. The extraneous matter is eliminated from the first pump 48. Consequently, the abnormal operation of the first pump 48 is resolved.

The first heat medium flows through the PCU cooler 47c and the SPU cooler 46c and then flows into the reservoir tank 17 together with the extraneous matter. In a case where air bubbles are in the first pump 48, they are released from the surface of the first heat medium in the reservoir tank 17, by which the air bubbles are eliminated from the channels. In a case where foreign matter is in the first pump 48, it is captured by the filter in the reservoir tank 17, by which the foreign matter is eliminated from the channels. The first heat medium in the reservoir tank 17 is suctioned by the second pump 53 and circulates in the above channels again.

In response to a predetermined time having passed since the first pump 48 was inactivated and the second pump 53 was activated at its maximum output, the controller 80 activates the first pump 48 again. The controller 80 checks the rotational speed of the first pump 48. If the rotational speed of the first pump 48 is still out of the allowable range, the controller 80 inactivates the first pump 48 again and activates the second pump 53 at its maximum output to cause the first heat medium in the second channel 12 to flow into the first pump 48 through the first channel valve 42.

If the rotational speed of the first pump 48 is within the allowable range, the controller 80 keeps activating the first pump 48 and switches the first channel valve 42 to the second valve position. In other words, the flow of the first heat medium between the first channel 11 and the low-temperature radiator 41 is cut off. As a result, the controller 80 restarts the heat pump mode.

Figure 5:
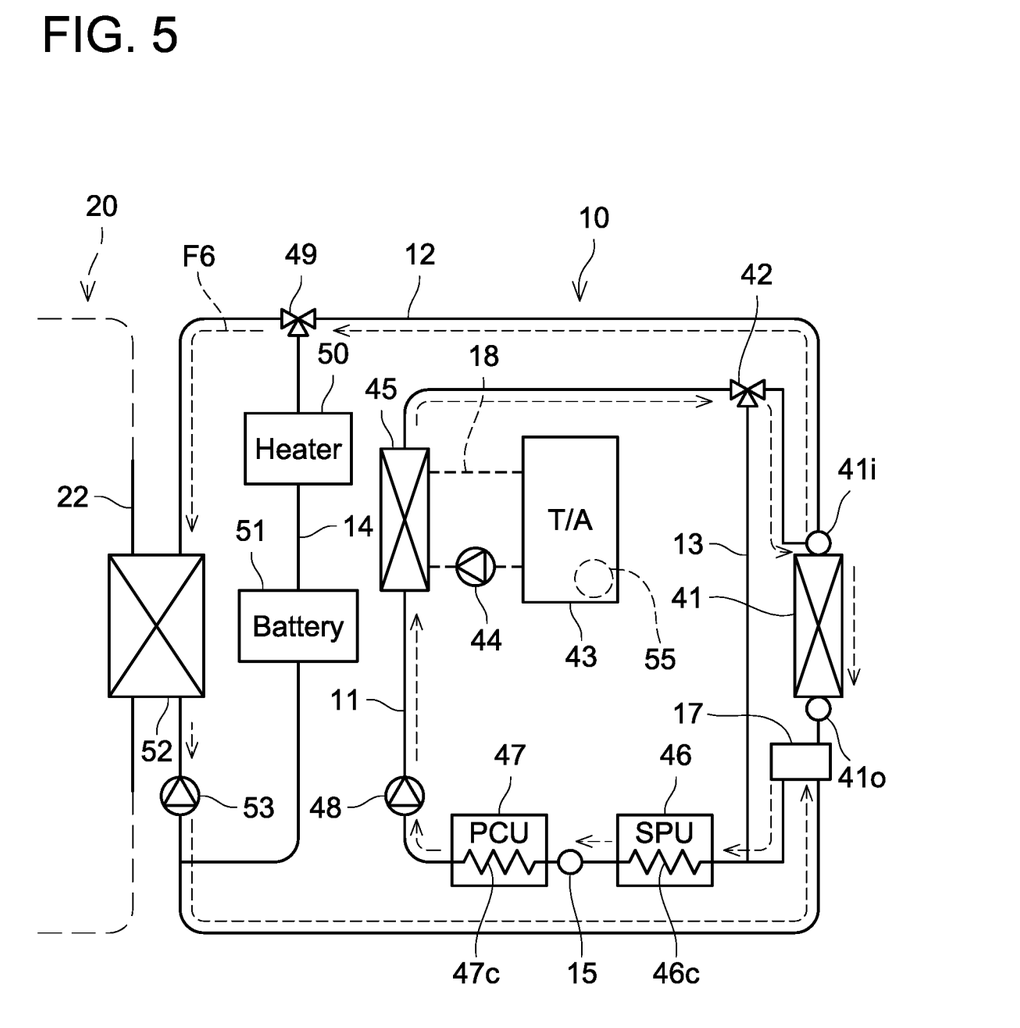
FIG. 5 is a circuit diagram showing a flow of the first heat medium when a second pump operates abnormally.

With reference to FIG. 5, control executed by the controller 80 when the second pump 53 operates abnormally and a flow of the first heat medium under the control will be described. When determining that second pump 53 operates abnormally based on the rotational speed of the second pump 53, the controller 80 inactivates the second pump 53. After this, the controller 80 switches the first channel valve 42 to the first valve position and holds the second channel valve 49 at the second valve position. In other words, the controller 80 allows the first heat medium to flow from both of the first channel 11 and the second channel 12 to the low-temperature radiator 41. The second channel 12 is connected to the first channel 11 via the inlet 41i of the low-temperature radiator 41. The controller 80 activates the first pump 48, which is not operating abnormally, at its maximum output. The first pump 48 pumps the first heat medium. As shown in FIG. 5, the first heat medium pumped out from the first pump 48 passes through the first channel 11 and splits at the inlet 41i of the low-temperature radiator 41. A part of the first heat medium flows from the first channel 11 into the low-temperature radiator 41, and the remaining part of the first heat medium flows backward in the second channel 12. As shown by a dashed arrow F6 in FIG. 5, the first heat medium that has flowed into the second channel 12 passes through the second channel valve 49 and the chiller 52 and then flows into the second pump 53, which is operating abnormally, from its downstream side. In other words, the first heat medium flows into the abnormally operating second pump 53 from its discharge port. The first heat medium that has flowed into the second pump 53 from its discharge port pushes extraneous matter in the second pump 53 to the outside of the second pump 53, by which the extraneous matter is eliminated from the second pump 53. Consequently, the abnormal operation of the second pump 53 is resolved.

The first heat medium flows into the reservoir tank 17 together with the extraneous matter. As described with reference to FIG. 4, the extraneous matter of the second pump 53 is eliminated in the reservoir tank 17. The first heat medium in the reservoir tank 17 is suctioned by the first pump 48 and circulates in the above channels again.

In response to a predetermined time having passed since the second pump 53 was inactivated and the first pump 48 was activated at its maximum output, the controller 80 activates the second pump 53 again. As in when the first pump 48 is operating abnormally, the controller 80 checks the rotational speed of the second pump 53, and if the abnormal operation has not been resolved yet, it repeats the above-described process. If the abnormal operation of the second pump 53 has been resolved, the controller 80 keeps activating the second pump 53 and switches the first channel valve 42 to the second valve position. In other words, the flow of the first heat medium from the first channel 11 to the low-temperature radiator 41 is cut off. As a result, the controller 80 restarts the heat pump mode.

As described above, when one of the first pump 48 and the second pump 53 operates abnormally, the controller 80 of the heat management system 100 according to the embodiment merges the first heat medium in the first channel 11 with the first heat medium in the second channel 12, which normally flow separately, thereby resolving the abnormal operation of the one of the pumps. As shown particularly in FIGS. 4 and 5, the first heat medium flows into the abnormally operating pump from its downstream side. The structure that enables the first heat medium to flow into the pump from its downstream side also contributes to the removal of extraneous matter from the pump.

Points to be noted relating to the technology described in the embodiment will be listed. The SPU 46 and the PCU 47 are examples of "power converter". The SPU cooler 46c and the PCU cooler 47c are examples of "converter cooler". The low-temperature radiator 41 is an example of "first heat exchanger", and the chiller 52 is an example of "second heat exchanger".

Variants of the above-described embodiment will be described below.

(First Variant) The above-described embodiment describes the control executed by the controller 80 during the heat pump mode. However, the heat management system 100 is not limited to the configuration shown in FIG. 1. For example, the second heat exchanger may be a device configured to transfer heat from the second heat medium to the first heat medium. In this case, the controller 80 basically holds the first and second channel valves 42, 49 at the second valve positions to allow the first heat medium to flow from the second channel 12 to the low-temperature radiator 41, as a result of which the heat of the second heat medium is released in the low-temperature radiator 41 via the first heat medium. In this case as well, if the temperature of the first heat medium changes by the first heat medium circulating in the first channel 11 merging with the first heat medium circulating in the second channel 12, the heat cannot be transferred properly from the second heat medium to the first heat medium. Thus, in a first variant as well, the controller 80 prevents the first heat medium in the first channel 11 from merging with the first heat medium in the second channel 12 by controlling the first channel valve 42 and the second channel valve 49, when the first pump 48 that circulates the first heat medium in the first channel 11 and the second pump 53 that circulates the first heat medium in the second channel 12 operate normally. When one of the first pump 48 and the second pump 53 operates abnormally, the controller 80 executes the above-described control to resolve the abnormal operation of the one of the pumps.

(Second Variant) When the first pump 48 or the second pump 53 operates abnormally, the controller 80 according to the above-described embodiment inactivates the abnormally operating pump. Instead of this, in a second variant, the controller 80 may execute the above-described control while keeps activating the abnormally operating pump.

(Third Variant) In the above-described embodiment, the second channel valve 49 is connected to the second bypass channel 14. In a third variant, however, a channel configuration that does not include the second bypass channel 14 may be adopted.

(Fourth Variant) In the above-described embodiment, the reservoir tank 17 is disposed downstream of the outlet 41o of the low-temperature radiator 41, and both of the first channel 11 and the second channel 12 are connected to the outlet 41o of the low-temperature radiator 41 via the reservoir tank 17. In a fourth variant, the reservoir tank 17 may be disposed only on one of the first channel 11 and the second channel 12. Moreover, reservoir tanks may be disposed respectively on the first channel 11 and the second channel 12.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A heat management system for a vehicle, comprising:
   an electrical device;
   a first heat exchanger configured to exchange heat between first heat medium for cooling the electrical device and outside air;
   a second heat exchanger configured to exchange heat between second heat medium for an air conditioner of a cabin and the first heat medium;
   a first channel in which the first heat medium flows, the first channel extending through the electrical device and connected to an inlet and an outlet of the first heat exchanger;
   a first pump arranged in the first channel and configured to circulate the first heat medium in the first channel;
   a second channel in which the first heat medium flows, the second channel extending through the second heat exchanger and connected to the inlet and the outlet of the first heat exchanger;
   a second pump arranged in the second channel and configured to circulate the first heat medium in the second channel;
   a first channel valve configured to cut off communication between the first channel and the first heat exchanger;
   a second channel valve configured to cut off communication between the second channel and the first heat exchanger;
   a bypass channel connected to the first channel, the bypass channel configured to allow the first heat medium to bypass the first heat exchanger and circulate between the electrical device and the first pump when the first channel valve cuts off communication between the first channel and the first heat exchanger; and
   a controller configured to control the first pump, the second pump, the first channel valve, and the second channel valve,
   wherein the controller is configured to:
   when the first pump and the second pump operate normally, control the first channel valve and the second channel valve such that a flow of the first heat medium from one of the first channel and the second channel to the first heat exchanger is allowed and a flow of the first heat medium from the other of the first channel and the second channel to the first heat exchanger is cut off; and
   when one of the first pump and the second pump operates abnormally, control the first channel valve and the second channel valve such that the flow of the first heat medium from both of the first channel and the second channel to the first heat exchanger is allowed and activate the other of the first pump and the second pump.

2. The heat management system of claim 1, further comprising a second bypass channel connected to the second channel, the second bypass channel configured to allow the first heat medium to bypass the first heat exchanger and circulate between the second heat exchanger and the second pump when the second channel valve cuts off the flow of the first medium from the second channel to the first heat exchanger.

3. The heat management system of claim 1, wherein
   a reservoir tank is connected to one of the first channel and the second channel, and
   in the reservoir tank, a surface of the first heat medium is in contact with air.

* * * * *